US011314997B1

(12) United States Patent
Guy

(10) Patent No.: US 11,314,997 B1
(45) Date of Patent: Apr. 26, 2022

(54) BARCODE TAG, AND METHOD AND SYSTEM EMPLOYING SAME, FOR TRACKING ELECTRONIC EQUIPMENT

(71) Applicant: RF Code, Inc., Austin, TX (US)

(72) Inventor: Jonathan Andrew Guy, Austin, TX (US)

(73) Assignee: RF CODE, INC., Austin, TX (US)

( * ) Notice: Subject to any disclaimer, the term of this patent is extended or adjusted under 35 U.S.C. 154(b) by 0 days.

(21) Appl. No.: 17/234,506

(22) Filed: Apr. 19, 2021

Related U.S. Application Data

(60) Provisional application No. 63/012,122, filed on Apr. 18, 2020.

(51) Int. Cl.
*G06K 19/06* (2006.01)
*G06K 7/14* (2006.01)
*G06K 19/077* (2006.01)

(52) U.S. Cl.
CPC ..... *G06K 19/06028* (2013.01); *G06K 7/1413* (2013.01); *G06K 7/1417* (2013.01); *G06K 19/0614* (2013.01); *G06K 19/0776* (2013.01)

(58) Field of Classification Search
CPC .......... G06K 19/06028; G06K 7/1413; G06K 7/1417; G06K 19/0614; G06K 19/0776
See application file for complete search history.

(56) References Cited

U.S. PATENT DOCUMENTS

| | | | |
|---|---|---|---|
| 4,149,394 | A | 4/1979 | Somes |
| 5,612,524 | A | 3/1997 | Sant'Anselmo et al. |
| 5,825,015 | A | 10/1998 | Chan |
| 7,181,066 | B1 | 2/2007 | Wagman et al. |
| 8,837,954 | B2 | 9/2014 | Primm et al. |
| 9,342,724 | B2 | 5/2016 | McCloskey et al. |
| 9,659,202 | B2 | 5/2017 | Kamijo et al. |
| 9,704,086 | B2 | 7/2017 | Primm et al. |
| 2007/0080234 | A1 | 4/2007 | Domoy |
| 2017/0200035 | A1* | 7/2017 | Teraura ............. G06K 7/10742 |
| 2019/0057409 | A1* | 2/2019 | Omer ................... G06K 7/1417 |
| 2019/0327826 | A1* | 10/2019 | Chang .................. H05K 1/0266 |
| 2020/0160129 | A1* | 5/2020 | Fan ....................... G06K 7/1417 |

OTHER PUBLICATIONS

Milgrom, Benjamin, et al., "Novel approach for extending the depth of field of Barcode decoders by using RGB channels of information", Optics Express 17027, Aug. 2, 2010, 13 pages, vol. 18, No. 16, Optical Society of America.

* cited by examiner

*Primary Examiner* — Matthew Mikels

(57) ABSTRACT

A barcode tag includes a base layer having a front side and a back side, an attachment surface disposed on at least a portion of the front side or the back side, and a barcode symbol comprising plural perforations formed entirely through the base layer. Methods and systems for tracking equipment items in an equipment rack using barcode tags are also disclosed.

23 Claims, 17 Drawing Sheets

Angled tag with printed QR Code

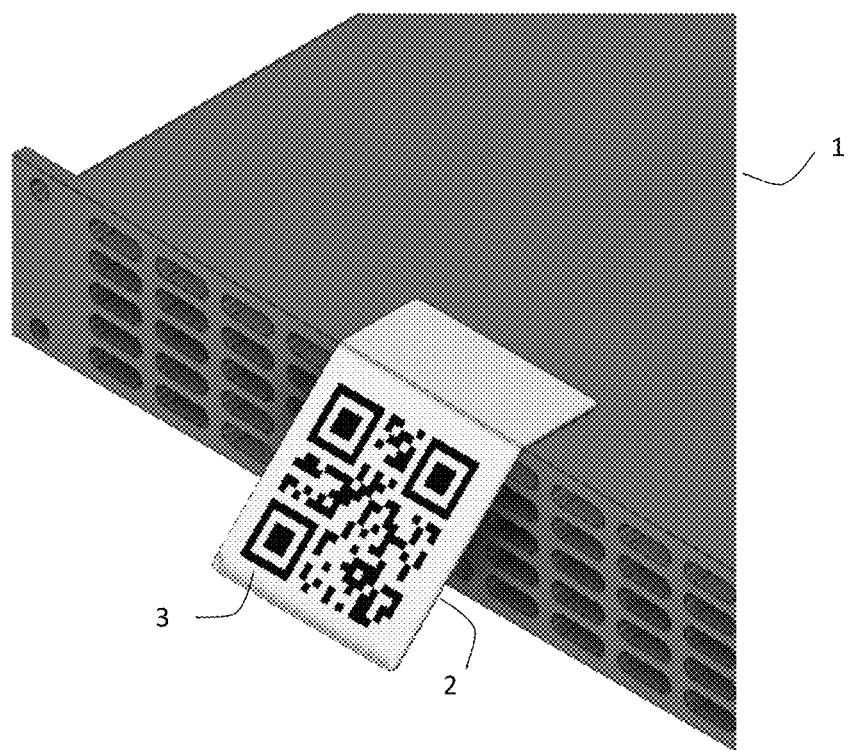
Figure 2 – Angled tag with printed QR Code

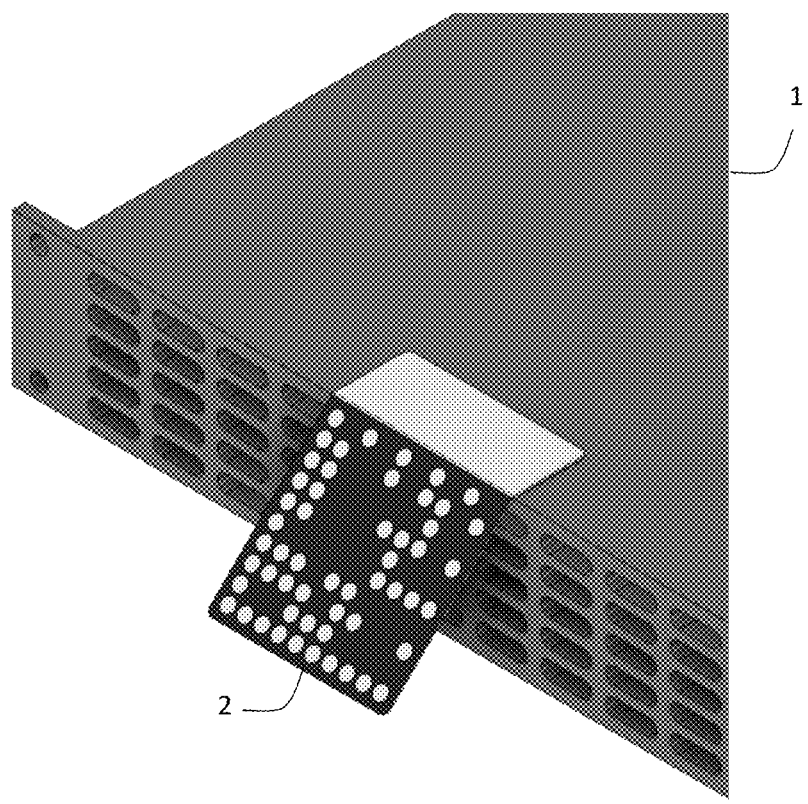
Figure 3 – Angled tag with conventional matrix barcode

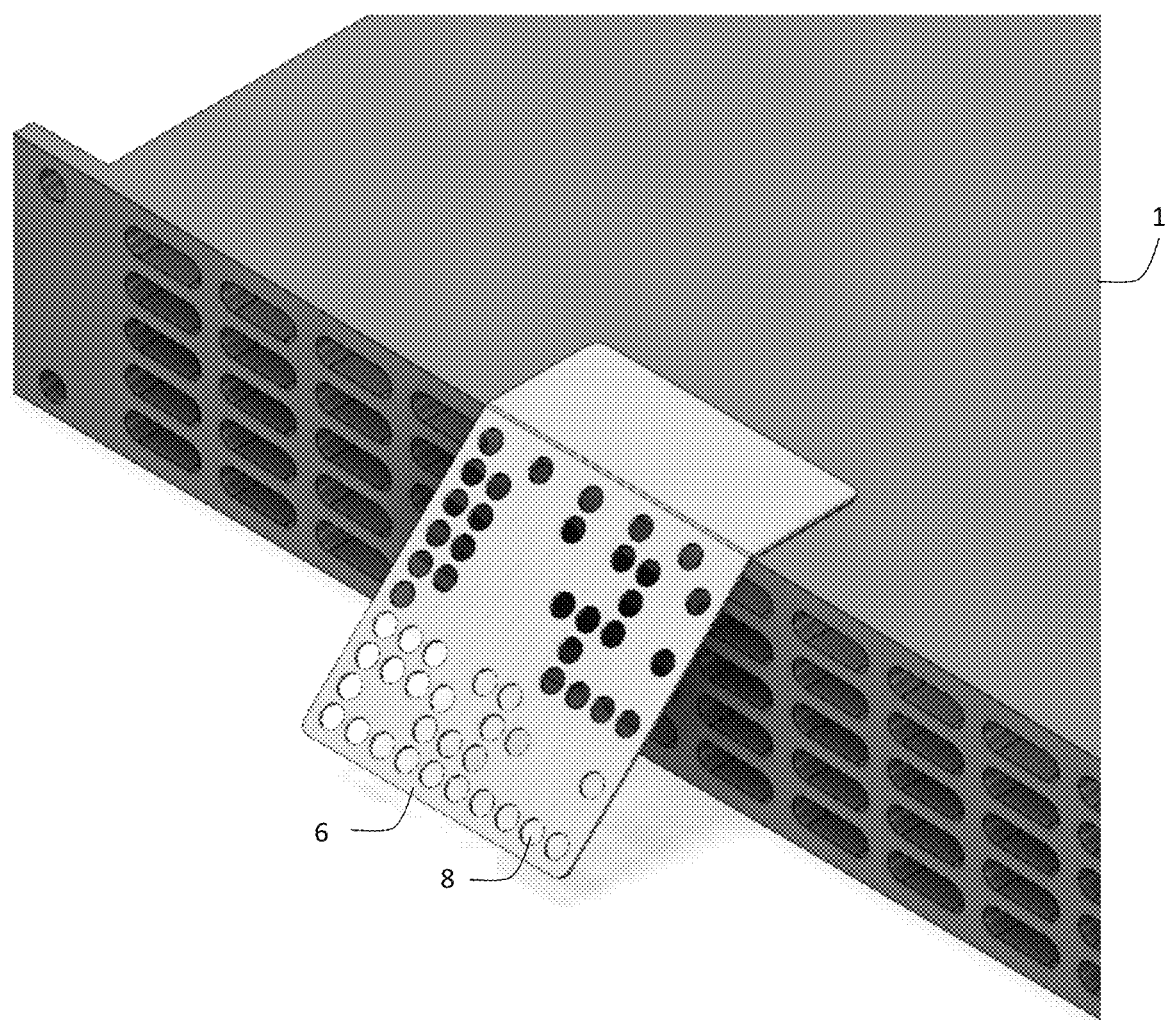
Figure 4 – Perforated Tag attached to a rack-mountable device

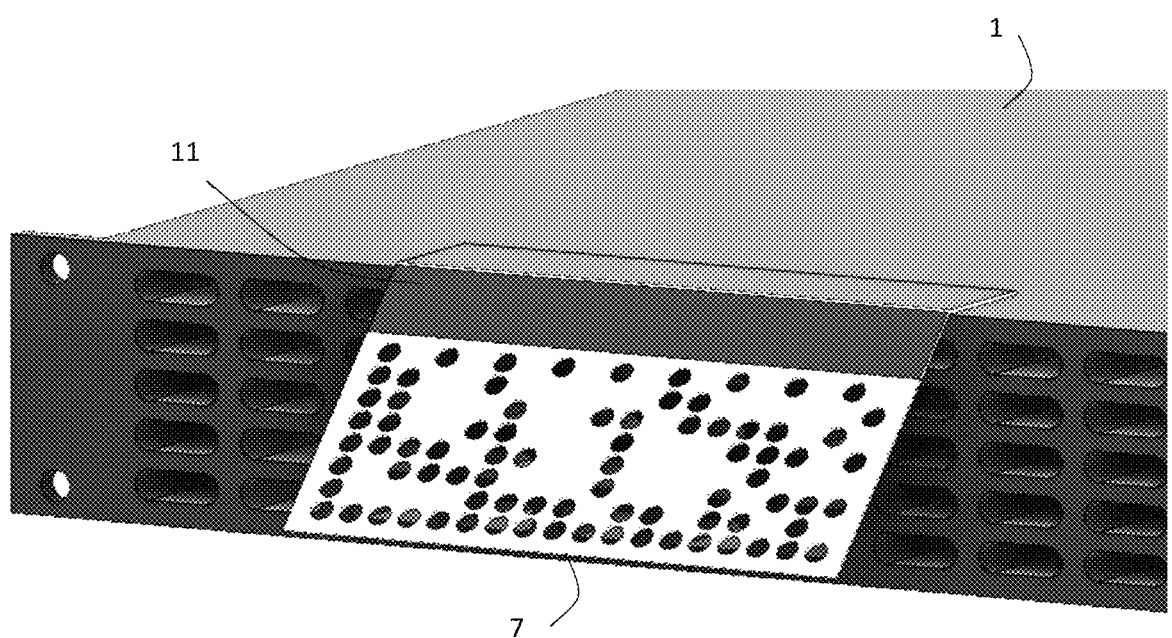
Figure 5 – Rectangular Perforated Tag

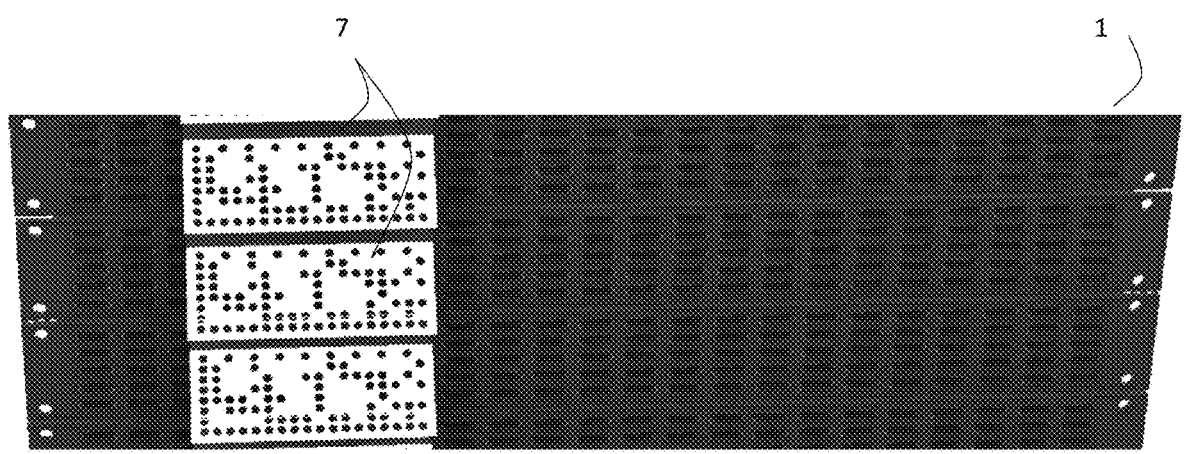
Figure 6 – Stack of servers with rectangular tags

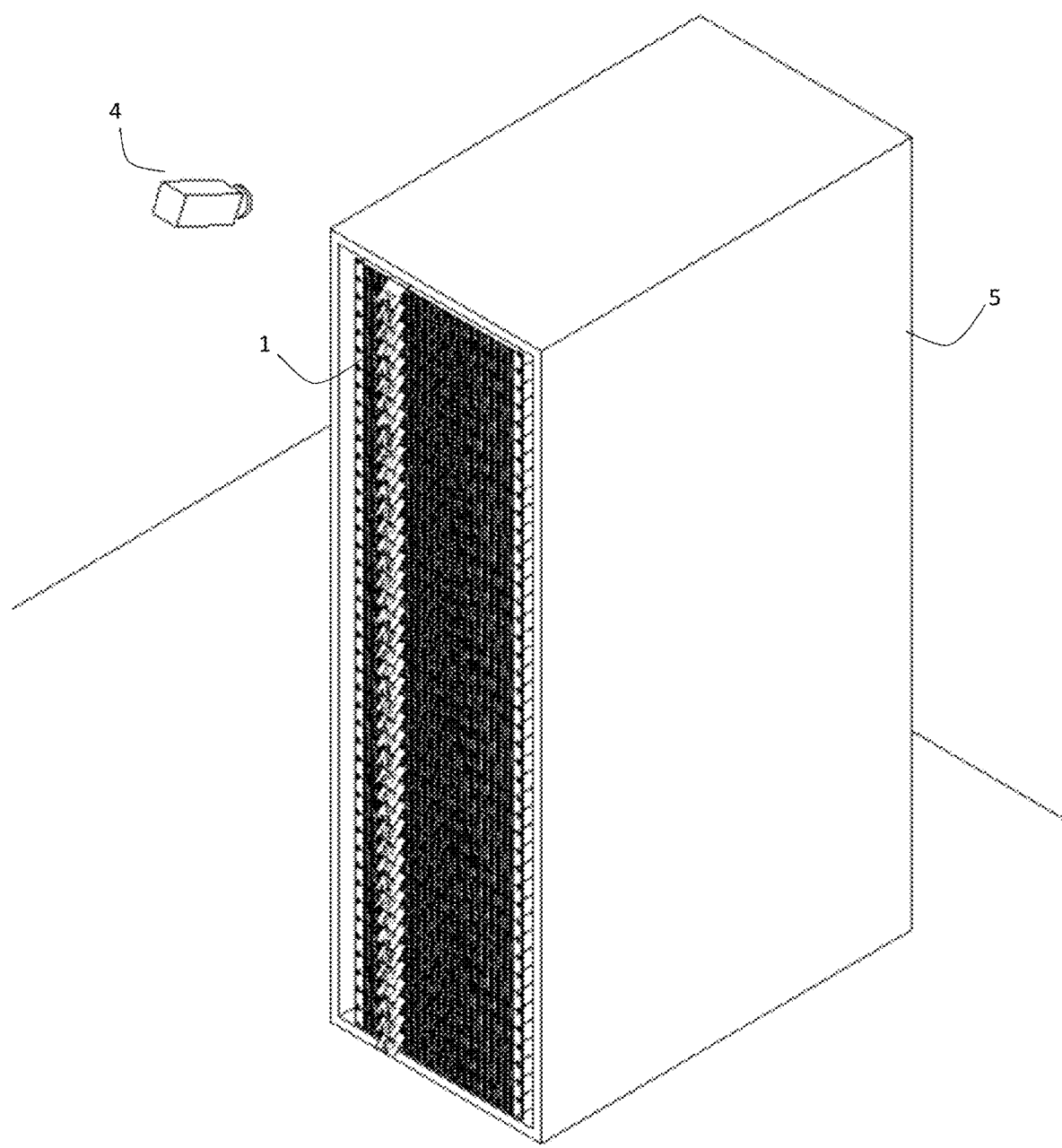
Figure 7 – Camera position in front of rack with tags

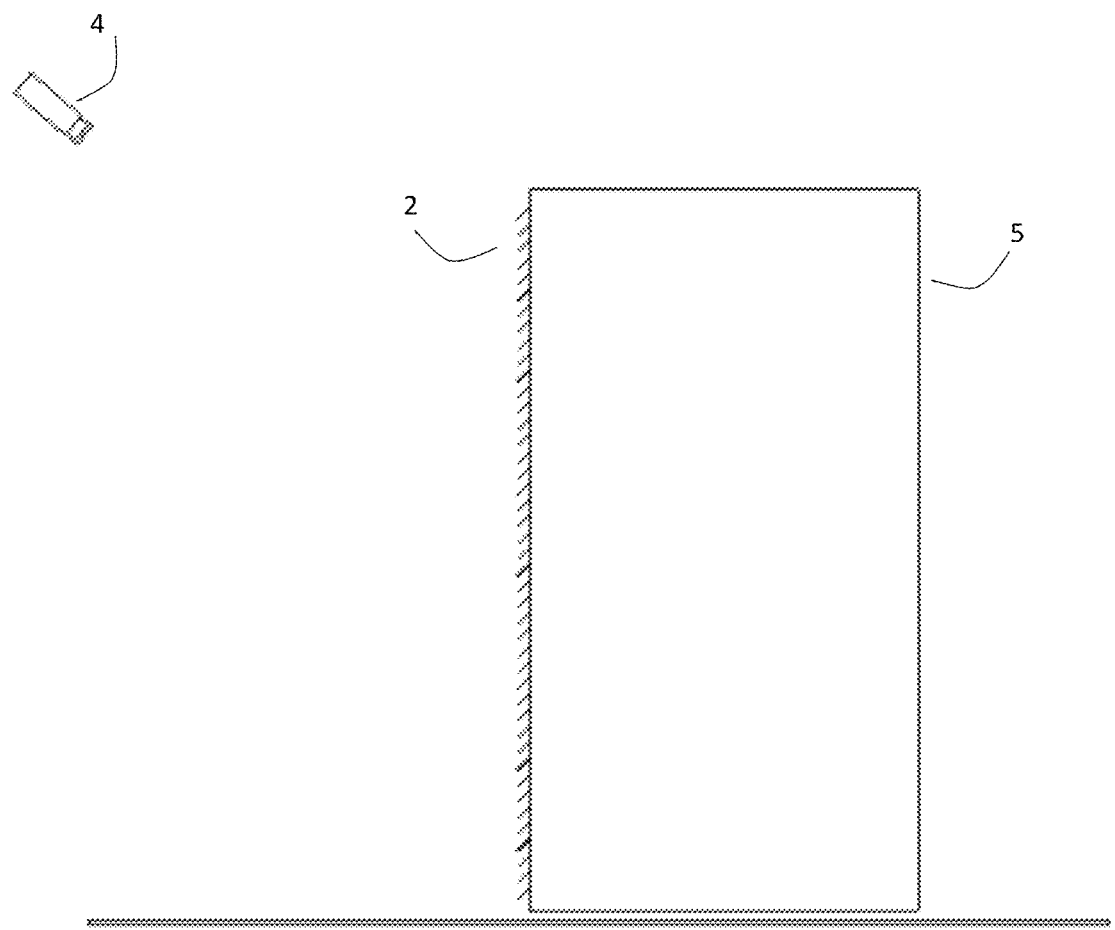
Figure 8 – Side view of camera facing rack

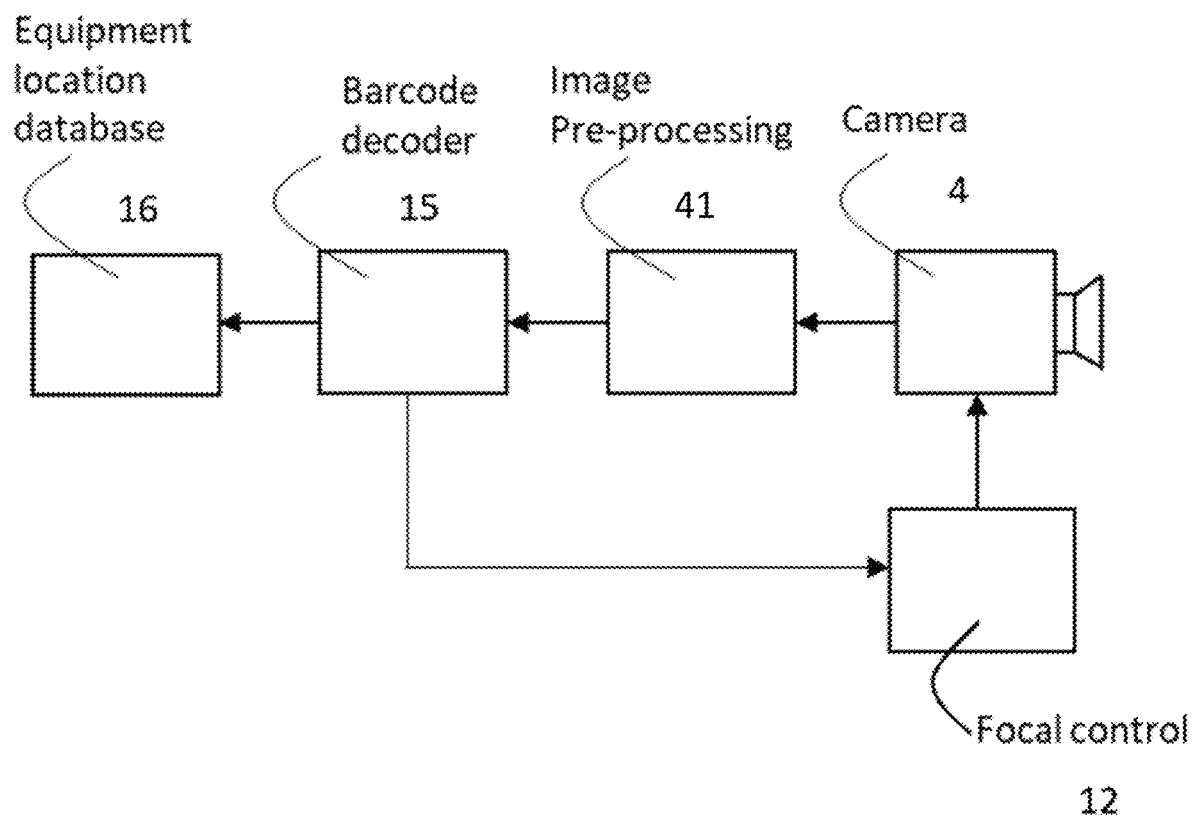
Figure 9A – Block diagram view of example system

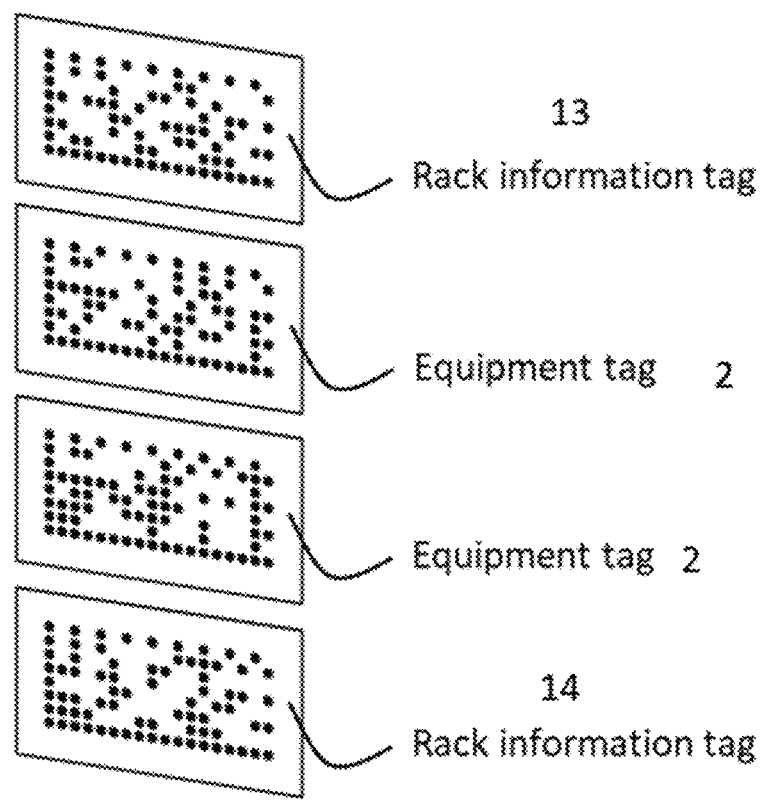
Figure 9B – Example reference and equipment barcode placements

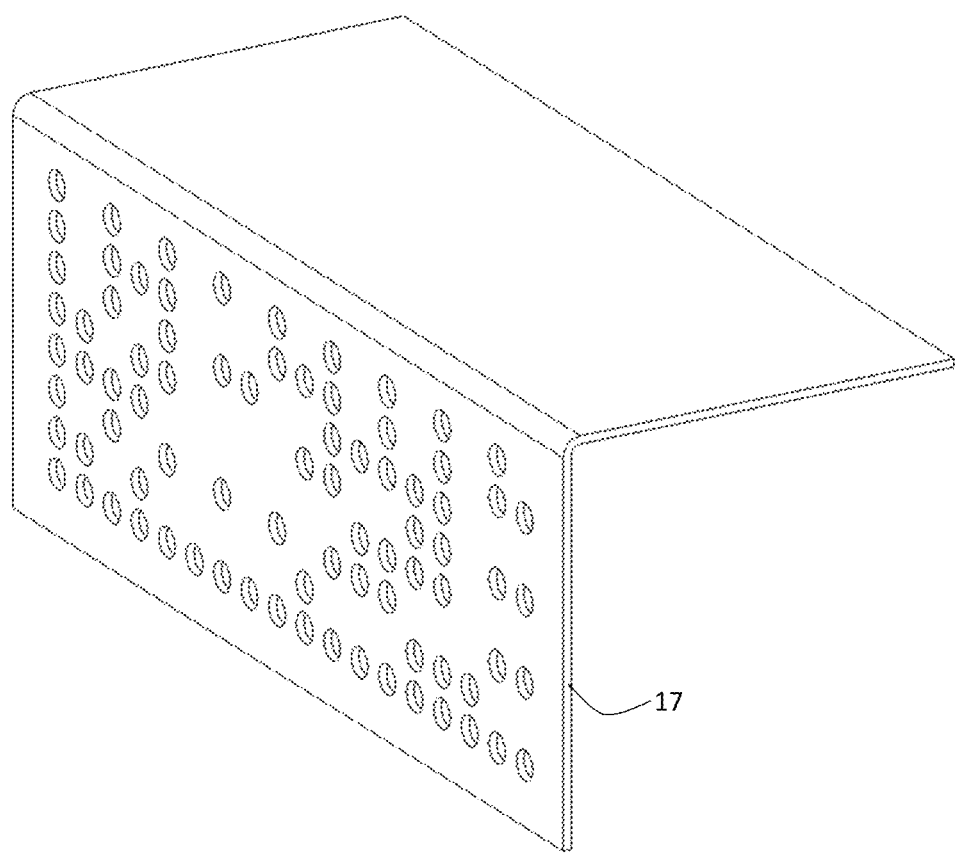
Figure 10 – Perforated Barcode Tag with right-angle tab (bend)

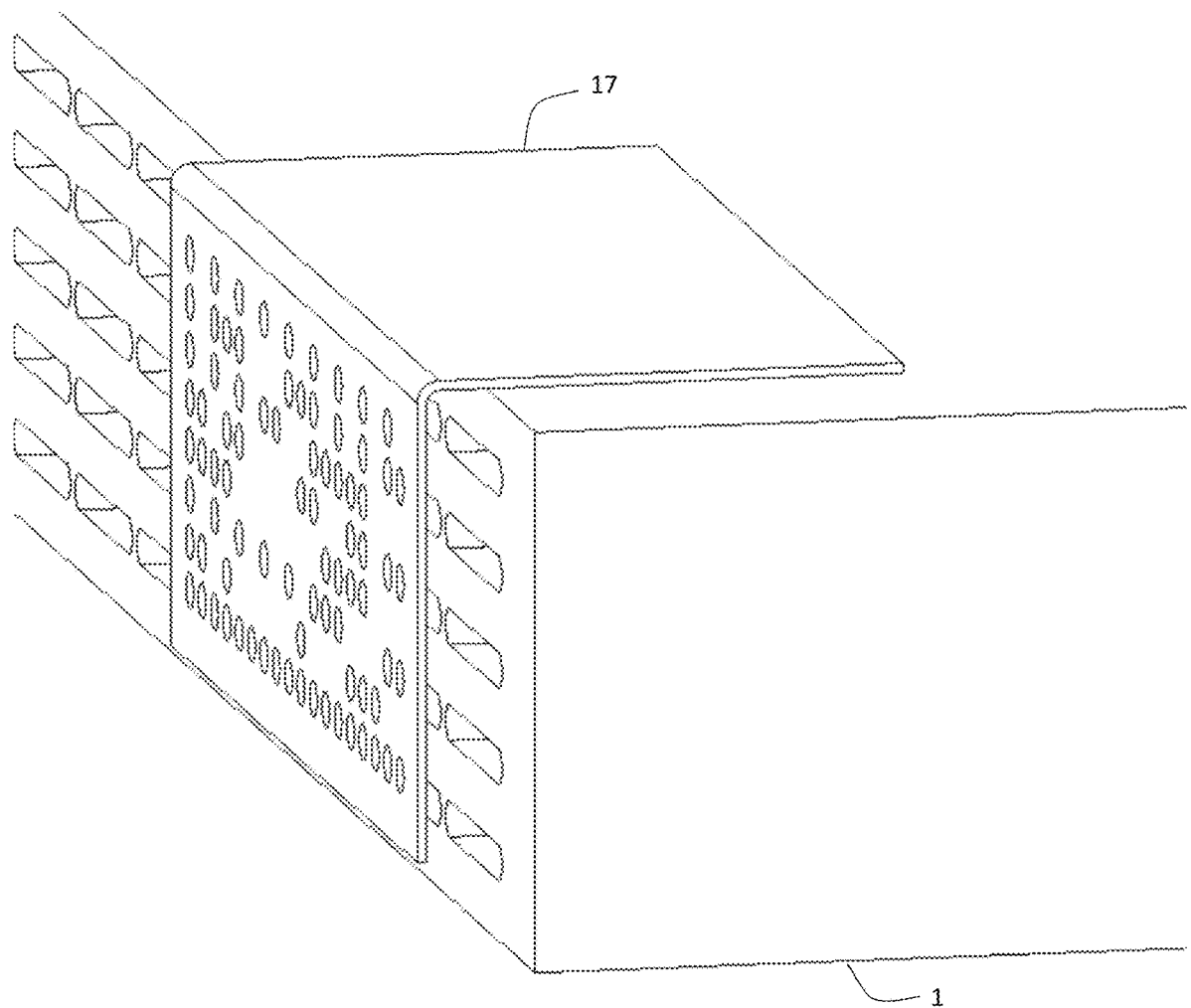
Figure 11 – Tag mounted on equipment

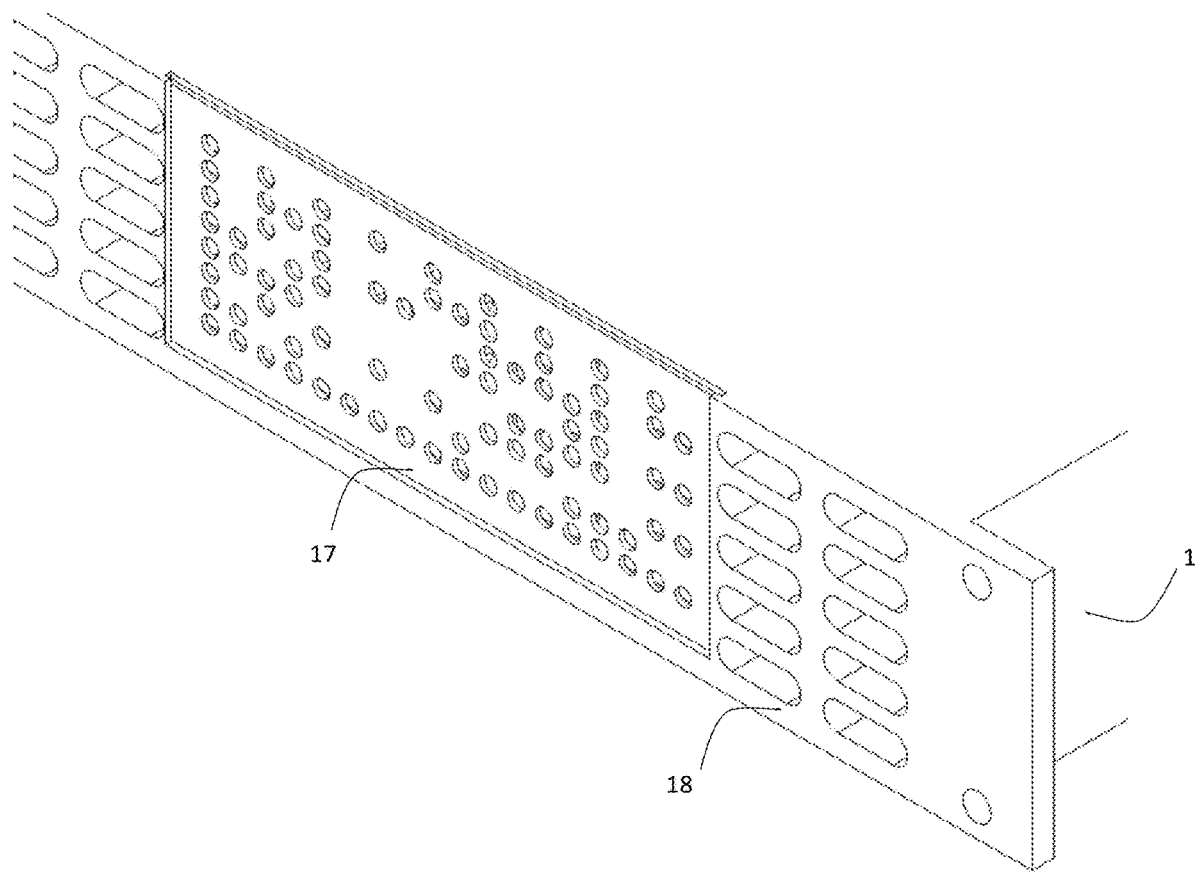
Figure 12 – Tag integrated into equipment

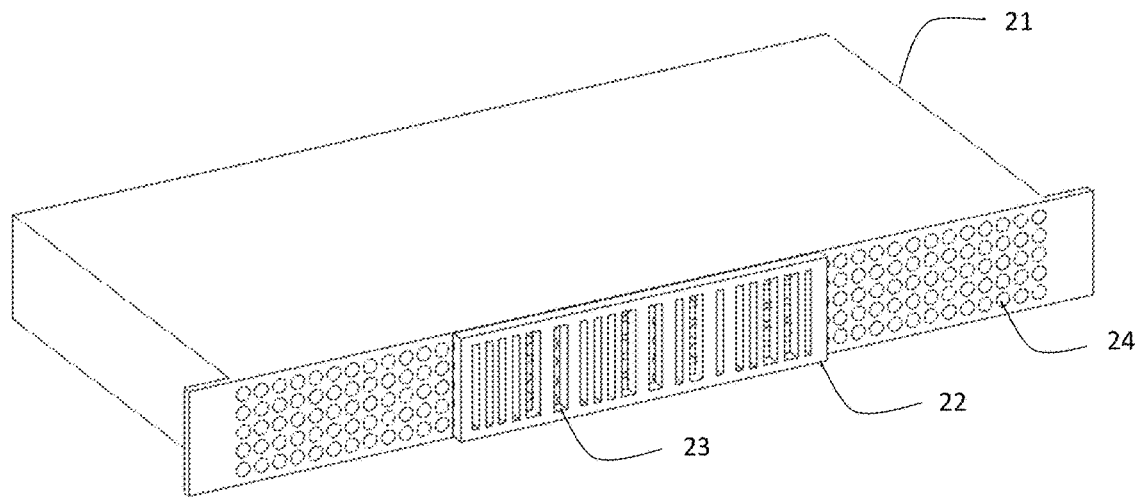
Figure 14 – One-dimensional barcode symbol example
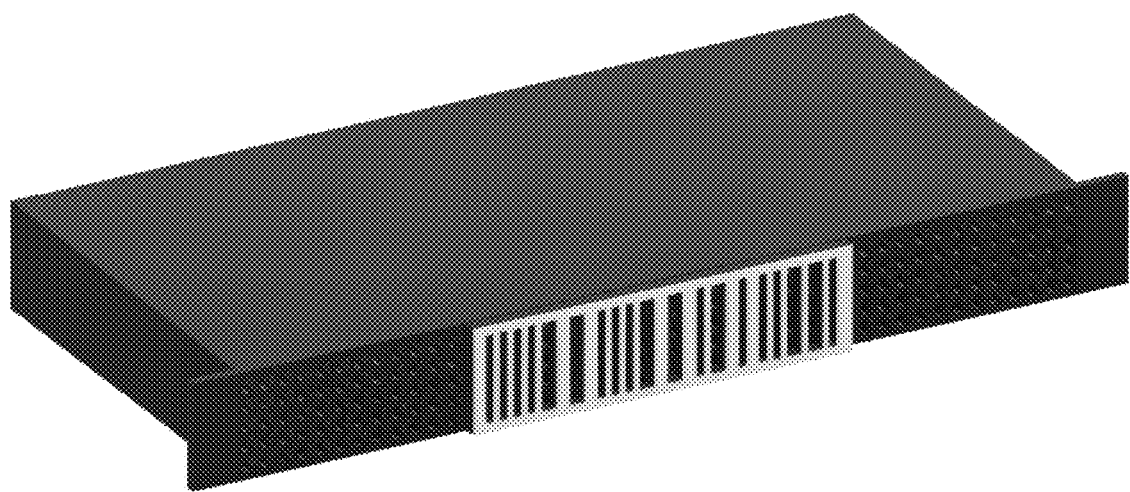
Figure 15 – Shaded version of Fig 14 to show color contrast

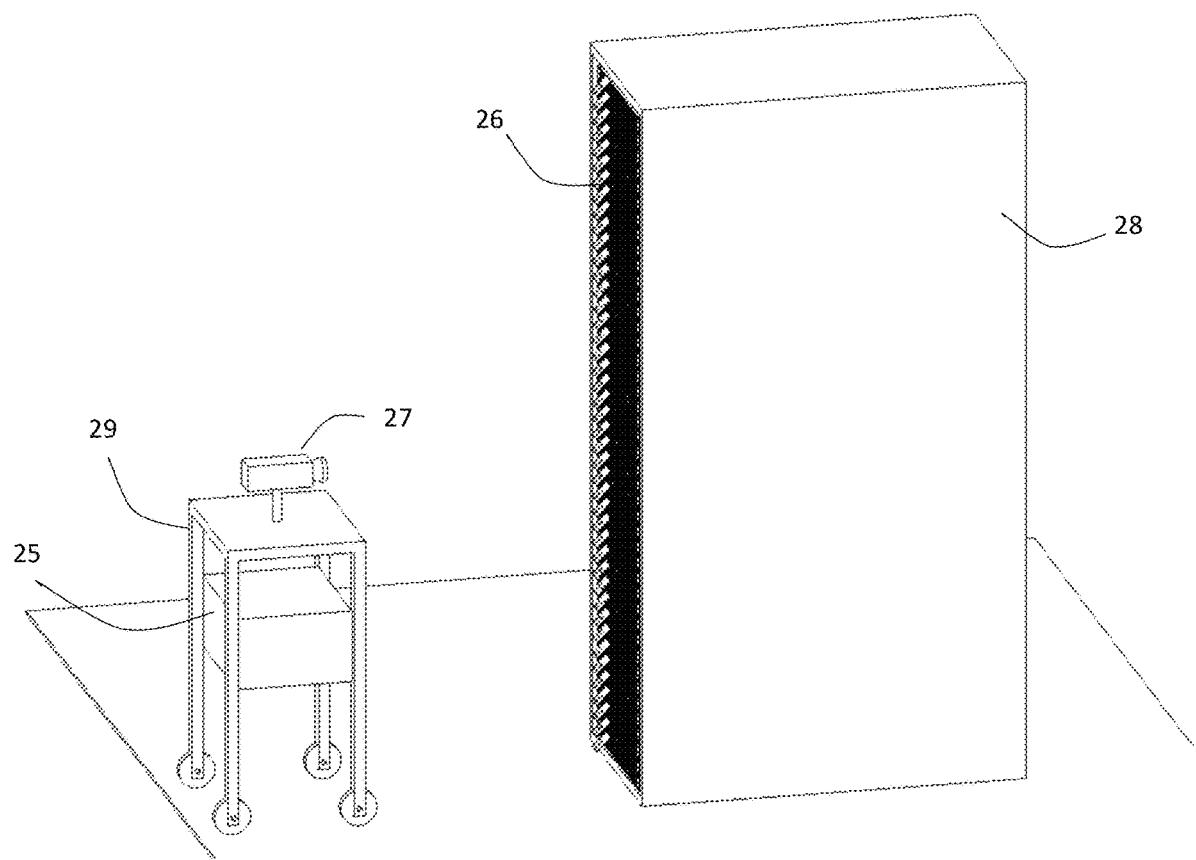
Figure 16 – Mobile scanner example

BARCODE TAG, AND METHOD AND SYSTEM EMPLOYING SAME, FOR TRACKING ELECTRONIC EQUIPMENT

CROSS-REFERENCE TO RELATED APPLICATIONS

This application claims the benefit under 35 U.S.C. § 119(e) of U.S. Provisional Application No. 63/012,122, filed on Apr. 18, 2020, the disclosure of which is incorporated herein by reference in its entirety.

TECHNICAL FIELD

This disclosure relates generally to barcode tags, and methods and systems for tracking the location of rack-based electronic equipment using barcodes.

BACKGROUND

With the ever-increasing popularity of cloud-based computer systems and applications hosted on such cloud-based systems, there is increasing demand for servers and networking equipment. Typically, servers and network equipment are housed in racks. Often servers and network equipment are maintained in large data center facilities including dozens or hundreds of racks, each housing dozens of equipment items.

In these data centers, it is advantageous to know the location of all equipment items or other assets mounted or installed in the various equipment racks. However, the exact physical location often cannot be determined merely by its network address. Additionally, when assets are unreachable via the network due to power loss or physical failure, it is impossible to determine their location via the network. As such, in facilities housing a large number of servers and network equipment, determining the location of a particular server or network device is difficult. In addition, tracking servers and network devices that are removed from racks for maintenance, storage, or decommissioning, or that may be missing due to theft, can be difficult. Most commonly these facilities are 'lights-out', meaning no personnel are immediately present to monitor the assets.

These issues present significant opportunities for improved systems, methods, and devices for determining the equipment items installed in each equipment rack.

BRIEF DESCRIPTION OF THE DRAWINGS

For a more complete understanding of the present disclosure and its advantages, reference is now made to the following description taken in conjunction with the accompanying drawings, in which like reference numerals represent like parts. However, these drawings illustrate only some of the embodiments and therefore are not to be considered limiting in scope. Moreover, any particular drawing may illustrate examples or features in accordance with more than one embodiment.

FIG. 2 illustrates an example angled barcode tag with a printed QR barcode.

FIG. 3 illustrates an example angled barcode tag with a printed Data Matrix barcode.

FIG. 4 illustrates an example angled barcode tag with a perforated barcode attached to a rack-mountable device.

FIG. 5 illustrates an example angled barcode tag with a rectangular perforated barcode.

FIG. 6 illustrates an example stack of servers with example rectangular perforated barcode tags.

FIG. 7 illustrates an equipment rack and a camera positioned in front of and above the rack, and each equipment item in the rack having attached thereto an example angled barcode tag.

FIG. 8 illustrates a side view of the configuration depicted in FIG. 7.

FIG. 9A illustrates an example system for tracking equipment items using barcodes.

FIG. 9B illustrates an example pair of rack information tags (i.e., reference tags) on opposites sides of an array of equipment tags.

FIG. 10 illustrates an example perforated barcode tag having a right-angle tab or bend.

FIG. 11 illustrates an example tag as shown in FIG. 10 mounted on an equipment item.

FIG. 12 illustrates an example perforated barcode tag integrated into an exterior panel of an equipment item.

FIG. 14 illustrates an example barcode having a one-dimensional barcode symbol, attached to a front panel of a rack-mountable equipment item.

FIG. 15 is a shaded version of FIG. 14, to better show contrast between the surface of the barcode tag and the front panel of the equipment item.

FIG. 16 illustrates an equipment rack and a camera positioned in front of the rack on a mobile platform.

DETAILED DESCRIPTION

FIGS. 1 through 17, discussed below, and the various embodiments used to describe the principles of this disclosure in this patent document are by way of illustration only and should not be construed in any way to limit the scope of the disclosure.

The ability to track the location of electronic assets in real-time allows the operators of datacenters and edge compute sites to increase thermal and operational efficiency, eliminate manual processes, ensure regulatory compliance, and enhance physical security. Efficiency is improved by detecting unused or missing assets and by supporting rack utilization planning. Assets can include, for example, servers, routers, switches, rack-based environmental equipment, storage devices, power distribution or conditioning devices, or other rack-based or free-standing equipment. Rack-based assets (also described herein as rack-mountable assets) are assets configured to be disposed or mounted in a rack. It is advantageous to be able to detect not only which equipment assets are in each rack, but also where each item is located within the rack. This is often referred to as the U-level position. A system that accurately reports U-level position allows rack capacity planning, analytical profiling of thermal behavior, weight distribution calculations and other operational metrics.

Tracking assets in a rack can be done with manual scanning of individual barcodes or passive RFID tags. This is time-consuming, is not real-time, and is subject to errors especially since the U-level must be separately scanned or entered.

Active RFID tags combined with infrared beacons can provide real-time rack identification, but issues with this approach include sensor cost, sensor size, limited battery life and lack of U-level position information. Positioning systems involving optics or RF signals can have poor accuracy due to multi-path propagation, shielding and equipment variation. To replace manual processes for tracking rack configurations to the U-level, positional accuracy should give 100% certainty that each equipment item is within a specific 1-U (1.75 inch) level.

Barcodes may be applied to equipment; however once installed in a rack, barcodes are only visible for scanning when mounted on the front or rear panels. An additional restriction is that a barcode mounted to the front or rear panel must be small in order to avoid blocking airflow. Even minor obstructions can impact server thermal performance. However, small barcodes typically cannot be read at a distance, so individual scanning at relatively close range is necessary.

Figure 1:
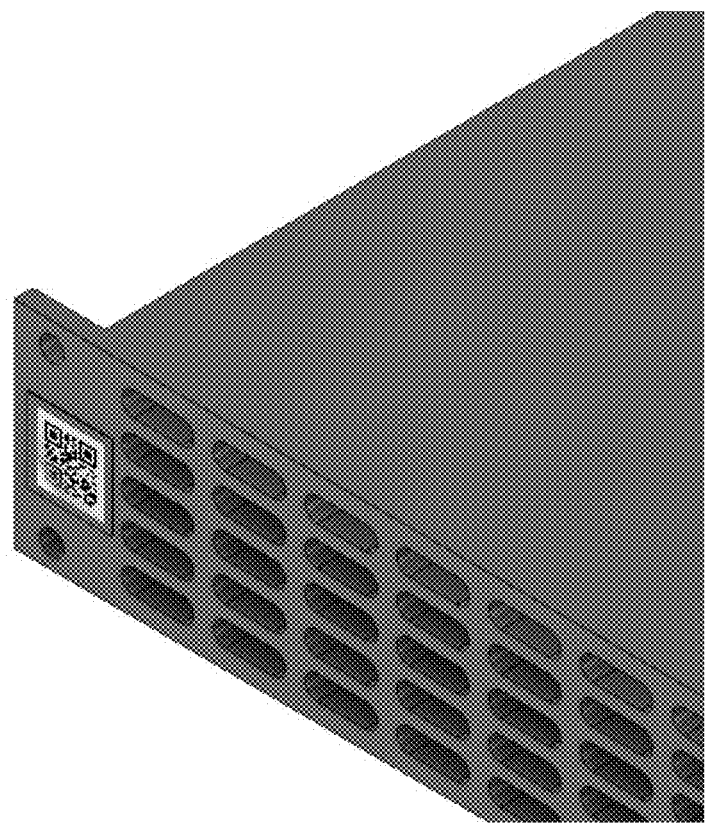
FIG. 1, labeled prior art, shows a typical rack-mountable device.

In addition to avoiding cooling vents, there are also other mechanical and electronic features that must be avoided. A survey of servers shows that the typical surface area available on a 1-U server front panel is 15 mm×15 mm or less. FIG. 1 shows a typical rack-mountable device and illustrates the limited area typically available for conventional 2D barcodes.

The ability of a fixed or mobile scanner for read an entire rack or multiple racks is determined by barcode size. Even using advanced barcode scanning technology (e.g., such as that available from Code Corporation) and a high-quality 12MP camera, the maximum read range for a 15 mm×15 mm label with a QR Code is only about 600 mm.

It is also desirable to be able to scan enough of a rack to determine the U-level location of each asset. However, if the barcodes on an entire rack are scanned by a single camera, each barcode symbol is distorted, particularly in height, by the viewing angle. Decoding software can correct distortion in most common barcode encodings, but reliability is poor at a distance.

Based on these limitations, existing systems and methods have limited applicability for tracking equipment to a rack and within the rack. Therefore, there is the need for a system providing tracking of equipment, preferably that does not impede the cooling mechanisms of the equipment.

For equipment located outside a rack, or for general electronic equipment such as computers, printers and communication devices, a large machine-readable barcode would enable a real-time tracking by fixed or mobile cameras. It would also simplify and expedite equipment audits by allowing scanning of a product identifier from a distance.

As will be appreciated, disclosed herein are multiple embodiments of barcode tags providing a sufficiently large symbol with high contrast to allow reliable scanning from a significant distance, and with significantly larger physical dimensions than previously possible, without impeding cooling, operation or transport of equipment assets. It should be noted that in this disclosure the term "barcode" refers to any form of symbol optimized for machine readability. For example, this could include, without limitation, a conventional linear barcode (i.e., a one-dimensional barcode), a QR Code (i.e., a two-dimensional barcode), or other symbol intended for machine scanning.

FIG. 2 illustrates an example angled barcode tag with a printed QR barcode. Referring to the non-limiting example of FIG. 2, an example barcode tag 2 includes a bend of approximately 135° as shown. Such a bend angle results in approximately a 45° angle relative to the front panel of the equipment, which is likewise approximately a 45° angle relative to the horizontal. The tag 2 is typically PVC or similar low-cost plastic sheet material. One surface contains a tracking barcode symbol 3 which can be oriented toward an elevated camera, for example as shown in FIG. 7 as described hereinbelow. The angle of the tag can be helpful for viewing the tags of a rack from a position at or above the height of the rack.

In some embodiments, a barcode tag can include a base layer having a bend that defines non-coplanar respective first and second sections on opposite sides of the bend, a barcode symbol disposed within the first section, and an attachment surface disposed within the second section. The attachment surface can be adapted to attach the barcode tag to an equipment item. In some embodiments, the attachment surface can include an adhesive coating to provide a self-adhesive attachment surface. In some embodiments, the barcode symbol is formed by a patterned surface layer disposed on a front surface of the base layer. For example, such patterned surface layer can be printed on the base layer of the tag. As another example, such patterned surface layer can be an embossed pattern on the front surface of the base layer.

In some embodiments, the bend can form an obtuse angle so that, when the barcode tag is attached to an equipment item, the second section contacts a first surface of the equipment item (e.g., the top surface of the equipment 1), and the first section forms an acute angle with respect to a second surface of the equipment item (e.g., the front panel of the equipment 1) perpendicular to the first surface of the equipment item. In some embodiments, the attachment surface can be disposed on a back surface of the second section and the barcode symbol can be disposed on a front surface of the first section.

FIG. 3 illustrates an example angled barcode tag with a printed Data Matrix barcode. Data Matrix is an industry standard, public domain encoding scheme for 2D barcodes. Data Matrix benefits include error correction, support for square and rectangular matrices and a dot peen standard, where square cells are replaced by stamped or engraved dots to represent each cell. Referring to the non-limiting example of FIG. 3, an example barcode tag 2 includes a two-dimensional array of patterned dots on a front surface of the tag. In some embodiments, the patterned dots can be formed by a surface layer of the barcode tag 2. For example, such patterned dots can be printed on the base layer of the tag 2. As another example, such patterned dots can be embossed into the surface layer formed on the base layer.

An angled tag significantly reduces the impact on airflow compared to a similar barcode applied directly to the face of the equipment. Due to the critical cooling requirements of a server, including those defined by the server manufacturer, even small obstructions can have a measurable impact on cooling performance. This is particularly critical in 1-U equipment with multiple modules and in blade devices which have inherently small ports for airflow.

FIG. 4 illustrates an example angled barcode tag with a perforated barcode attached to a rack-mountable device, e.g., a server. Referring to the non-limiting example of FIG. 4, an example barcode tag 6 utilizes perforations 8 to form a 2D barcode. These perforations 8 also provide for additional airflow, which further reduces the thermal impact to the attached equipment. Additional perforations, redundant to the barcode, can be added for additional airflow. In some embodiments, the tag can be a light-colored material to contrast with the dark paint or black anodizing commonly used on rack-mountable equipment. Testing with white PVC tags has shown that perforations 8 form very effective symbol dots where the tag is mounted on or adjacent to equipment. While high-contrast is preferable, it is not essential as digital image processing can be employed to effectively extract and decode low-contrast barcode images.

In some embodiments, a barcode tag includes a base layer having a front side and a back side, an attachment surface disposed on at least a portion of the front side or the back side; and a barcode symbol comprising plural perforations formed entirely through the base layer.

In some embodiments the plural perforations can include generally circular holes, and the barcode symbol can be a two-dimensional bar code formed by the generally circular holes. In some embodiments, the generally circular holes can be polygonal openings. For example, polygonal openings can be hexagons, octagons, etc.

A Data Matrix symbol can encode between 5 and 8 character-codes in the range 0 to 39 using an 18×8 grid of dots. This gives over 4 billion possible tag identifiers which is enough for globally unique serialization of equipment. An 18×8 Data Matrix symbol typically has around 80 dots with a minimum around 73. Using a uniform dot diameter of 3 mm and a pitch of 4 mm, the resulting path for air is 504 mm$^2$. This represents approximate 20% of a typical tag with a surface area of 2690 mm$^2$. Tests have shown that airflow is minimally impacted by a perforated tag, placed directly on equipment, but a solid tag of similar area creates a hot zone in that region of the equipment.

FIG. 7 illustrates an example equipment rack and camera positioned in front of and above the rack, and each equipment item in the rack having attached thereto an example angled barcode tag. The angled tags can be helpful for viewing a rack from a camera position at or above the height of the rack. FIG. 8 illustrates a side view of the configuration depicted in FIG. 7. FIG. 9A illustrates an example system 40 for tracking equipment items using barcodes. FIG. 9B illustrates an example pair of rack information tags 13, 14 (i.e., reference tags 13, 14) on opposites sides of an array of equipment tags (shown in this example as two such equipment tags 2). In certain embodiments, each equipment tag can be attached to a respective equipment item installed in a respective one of a plurality of equipment slots arranged in an array within the equipment rack.

Referring to the non-limiting example of FIG. 7 together with the non-limiting example of FIG. 9A, an example camera 4 feeds video or still images to barcode decoding software 15. The decoding software 15 analyzes the images and sends the data from each barcode tag 2 to an asset tracking system. The system includes an equipment location database 16 that associates each barcode tag 2 with a corresponding equipment item 1. The image pre-processing 41, the barcode decoder 15, and the focal control 12 functions can be viewed as implemented within a controller (e.g., a computer 25 also described herein), which controller can include a processor and memory. In some embodiments, the controller can include a network interface, such as a wireless or wired interface, to communicate with a database server and/or other resources external to the computer. In some embodiments, the controller can include a position locating system, such as a GPS system.

A typical 42-U rack 5 is approximately 1.9 m in height. A camera 4 mounted at 1.9 m is assumed to be high enough to avoid impeding service personnel. Based on testing of both QR Code™ and Datamatrix™ formats, reliable scanning of barcodes on a full rack was found to require a minimum square barcode size of 40×40 mm. Each tested tag encoded 6 characters. With 6 characters, over 2 billion unique encodings are supported.

In certain embodiments including a bend and a perforated barcode, airflow through the equipment 1 is not significantly obstructed, the tag 2 can be attached to surfaces other than the primary face of the equipment, and yet the barcode symbol 3 can be oriented toward the camera 4. The optimal angle is where the barcode at the bottom of the rack (lowest U-level) is substantially orthogonal to the axis of the camera. This is because the lowest U-level is furthest from the camera so the resolution of the camera versus the size of each barcode element becomes limiting. At the top of the rack, the barcode can be at oriented at 45° to the camera, reducing the viewable size to ~0.7 of the actual size, but since the camera is closer to the top of the rack than the bottom, software can more easily de-skew the barcode images near the top of the rack. The angled attachable tag, combined with a fixed camera, improves upon prior systems and methods, by allowing a complete rack of ID barcodes to be scanned effectively from a single fixed location.

In some embodiments, depending on the dimensions of the angled tag, the symbol of some tags might not be visible from a single camera location. For example, as the camera is moved closer to the face of the rack, fewer symbols will be visible due to the partial shadowing of a tag by an overlying tag.

FIG. 5 illustrates an example angled barcode tag with a rectangular perforated barcode. Referring to the non-limiting example of FIG. 5, an example rectangular tag 7 includes plural perforations to form the barcode symbol, encoding identical barcode information as the example tag shown in FIG. 4 above, but utilizing a portion of the tag for the rectangular symbol. In some embodiments, the symbol is formed within a portion that is no more than 70% of the face of the tag on the outward side of the bend. This can allow a full rack of tags to be captured from a single camera location, such as, for example, a fixed location.

In some embodiments, a rectangular barcode tag can include a contrasting region 11 adjacent to the barcode symbol, but in certain other embodiments the region 11 can be the base layer without a contrasting color or reflectivity. In some embodiments, a rectangular barcode tag can include a barcode symbol formed by a patterned surface layer disposed on the front surface of the tag.

Figure 13A:
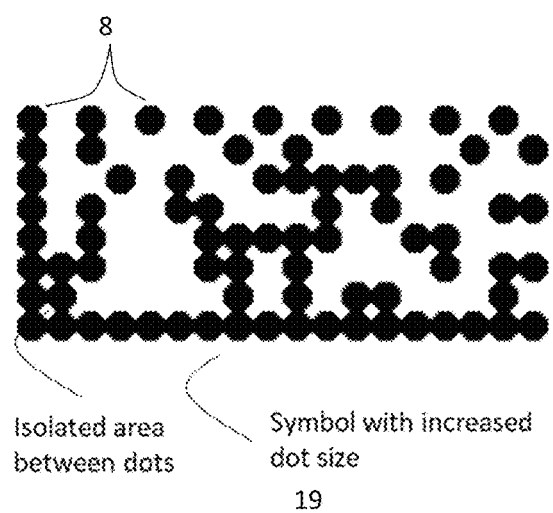
FIG. 13A illustrates an example perforated barcode symbol having enlarged hole size.
Figure 13B:
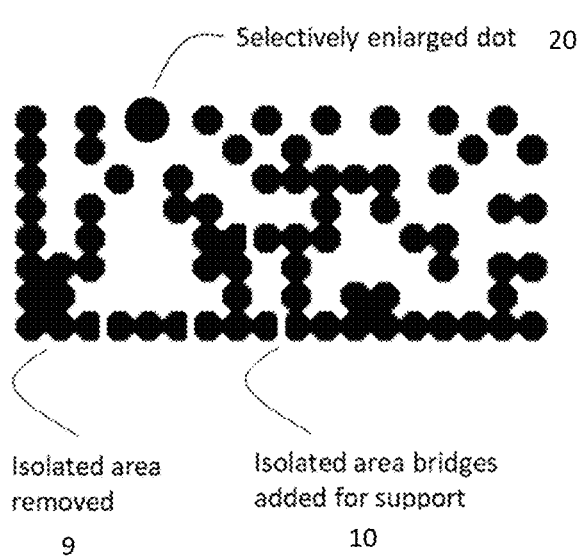
FIG. 13B illustrates an example perforated barcode symbol having non-uniform hole sizes.

FIG. 13A illustrates an example perforated barcode symbol having enlarged hole size, and FIG. 13B illustrates an example perforated barcode having non-uniform hole sizes. Referring to the non-limiting example of FIG. 13A, an example perforated tag having perforations 8 includes enlarged holes 19 (i.e., enlarged "dot size") for increased airflow. Referring to the non-limiting example of FIG. 13B, an example perforated tag having perforations 8 can include non-uniform sized perforations. For example, individual perforations 20 can be selectively enlarged to provide even more airflow. Any perforated dot 8 (i.e., perforation 8) location that, if enlarged, does not compromise the mechanical integrity of the tag, can be enlarged to increase airflow. Perforated dots can be enlarged such that they intersect without significantly compromising the ability to scan the symbol. In such embodiments, the area for airflow can be increased significantly over a uniform arrangement of dots.

When perforations are enlarged to the point of connection, the mechanical integrity of the tag will be impacted to a degree dependent on the pattern. To address this, system software that generates the barcode patterns can automatically and selectively enlarge dots, remove unnecessary islands 9 of tag material, and add bridging material 10 for supporting islands that must remain to preserve the symbol.

In some embodiments, the plural perforations are non-uniform in size, with individual perforations that are not adjacent to another perforation having a larger size than individual perforations that are adjacent to another perforation.

An additional benefit of a perforated tag 6, 7 is a reduced tendency for the tag to flap due to airflow. Flapping makes it difficult to scan the tag and can also result in fracturing of the tag, especially at the bend point. The addition of perforations reduces the surface area, and therefore pressure on the tag from equipment-cooling airflow is reduced. The material used for the tag need not be as rigid when perforations are present. Material thickness is a factor when mounting tabs to the top of equipment as gaps between equipment in racks is often less than 0.5 mm. Thinner tag material makes installation much easier and reduces the tendency for tags to snag when sliding equipment in and out of a rack.

When equipment with perforated tags is stacked, a portion of the tag located below the tag being scanned will be visible through the perforations of the tag being scanned. If the material of this portion has the same color as the portion around the perforations, the contrast will be reduced. To improve contrast, the inactive portion of the tag can have a color and/or reflectivity different from the color and/or reflectivity around the symbol of the tag. In some embodiments the color and/or reflectivity can be like that of the equipment front panels. Referring again to the non-limiting example of FIG. 5, an example rectangular tag 7 includes plural perforations to form the barcode symbol. A contrasting area 11 has a different reflectivity than the portion of the tag surrounding the perforations. In some embodiments, contrasting area 11 can have a color tone like that of the equipment 1.

The example barcode tag 7 illustrated in FIG. 5 can be described as including a base layer having a bend that defines non-coplanar respective first and second sections on opposite sides of the bend. The bend can, but need not, bisect the tag, and thus the first and second sections can, but need not, be identical in size. Moreover, the bend can form an obtuse angle so that, when the barcode tag is attached to an equipment item, the second section contacts a first surface of the equipment item (e.g., the top surface of equipment 1), and the first section forms an acute angle with respect to a second surface of the equipment item (e.g., the front panel of the equipment 1) perpendicular to the first surface of the equipment item. The barcode symbol can be disposed within the first section of the barcode tag, and the attachment surface can be disposed within the second section of the barcode tag. The first section of the barcode tag can be viewed as having a first portion and a second portion different than the first portion. In some embodiments, the barcode symbol can be disposed within the first portion of the first section, and the second portion of the first section can include a surface that is different in reflectivity of incident light than is the surface of the first portion. In some embodiments, the barcode symbol can include plural perforations formed entirely through the base layer. In some embodiments, the barcode symbol can include a patterned surface layer.

FIG. 6 illustrates a stack of servers with example rectangular perforated barcode tags that illustrates such improvements. In the non-limiting example of FIG. 6, three example rectangular tags 7 are illustrated. Only the first section of each tag can be seen, as the second section is attached to the top of each installed equipment item 1. As can be appreciated, the bottom of each tag 7 extends out from the plane of the front panels, and overlays the upper portion of the underlying tag 7. Since each of the tags 7 includes a contrasting area 11 in the upper portion of the tag, this contrasting area 11 will be visible through one or more of the lower rows of perforations of each tag, and provide better contrast than without such a contrasting area 11.

It is common to have racks that are not fully populated. Typically, blanking panels are installed to optimize airflow, provide protection and improve cosmetics. By affixing to the blanking panel or empty space a barcode that differs from the equipment barcode, the system can more accurately determine the position of each equipment item. For large or sparsely populated racks, this is more accurate than using optically determined barcode position to calculate location.

Lights-out environments are common in locations where people are not present. In this environment it is desirable to maintain real-time operation of the camera and barcode scanning system. An angled tag (e.g., tag 2, 6, 7, 17) can be improved by using a material that reflects light as the base layer. In some embodiments, an infrared light source near the camera 4 can illuminate the rack 5 allowing the camera 4 (without IR filter) to read barcodes symbols 3, as well as perforated symbols.

One challenge of using a camera 4 for barcode scanning on a rack 5 of equipment 1 is the depth of field needed to capture the individual barcodes. In this situation, cameras 4 having programmatically controlled focal distance can be employed to enable successful barcode scanning. An example method uses reference barcodes 13, 14 at the top and bottom of each rack, then performs, under barcode decoder 15 software control, the following steps:

1. The camera 4 starts at a focal control 12 limit, then increments focus (i.e., focal distance) until the first reference barcode 13 is detected.
2. The camera 4 then starts at the opposite focus control 12 limit, then increments focus until the second reference barcode 14 is detected.
3. The number of focus distance steps between the reference barcodes is divided by the number of equipment levels in the rack to give a focal control increment.
4. The camera 4 adjusts the focal control 12 by the calculated increment, captures an image and decodes for any equipment barcode tags 2.
5. Duplicate barcodes from prior scans are discarded.
6. The process continues from step 4 until the focal control has swept to the other focus control limit.
7. The reference barcode 13 is detected again as validation of the complete scan process.

If the rack 5 is full or additional barcodes are installed on blanking panels, the method can be further optimized on subsequent scans by increasing the focal increment until one or more barcodes are missed, then reducing the increment to the last full scan. For example, a 42-U rack would expect a total of 44 unique barcode scans, including reference tags. Where equipment occupies more than one U-level in the rack, a database 16 of asset types can be used to adjust the number of expected barcode scans.

The method can also be applied to applications where multiple racks are in view of a single camera.

For a vertical rack, the position in the rack (U-level) of each equipment item can be determined by image analytics by first calculating the X-Y coordinates of each barcode, then sorting the Y coordinates into an ordered list. The U-level is the index into the ordered list. The reference barcodes at the top 13 and bottom 14 of the rack act as validation points and can additionally encode information about the rack such as the rack identifier, rack size, rack location, etc. Since the reference barcodes are uniquely identifiable, the orientation of the equipment can be automatically adjusted by determining whether the offset between the reference tags is primarily in the X or Y axis and by scanning and sorting between those points.

In various embodiments described herein, an image, such as a still image or video image captured from a camera, is scanned to locate a barcode symbol therein, and the barcode symbol decoded from the image. An example method for achieving this for both 1D and 2D barcodes can be performed under barcode decoder 15 software control. In some embodiments, an example process includes performing the following steps.

1. Read (i.e., capture) an image from a camera into computer memory attached to a processor. For example, the memory and processor can form part of the computer described in reference to FIG. 9.
2. Programmatically apply thresholding to reduce the image in memory to a bi-level (black and white) image. The threshold can be fixed, adjustable based on ambient lighting or overall image brightness, or iterative.
3. If the base layer is more reflective than the background as viewed through the perforations, then the image can be inverted such that the symbol elements are encoded as black.
4. Programmatically scan the image in memory to identify the location of each symbol using the distinct characteristics inherent in the symbol design. These are often called "finder" patterns.
5. For each symbol in the image, calculate and adjust for the alignment and/or rotation of the symbol, so that the adjusted image is orthogonal to the data structure in memory.
6. Extract the timing from the symbol, that is, the spacing of the grid of dots, bars or other elements.
7. Using the symbol timing, reduce the image to a matrix of binary values representing the barcode symbol. For example, a Datamatrix 8×18 symbol can be represented by an 8×18 matrix of binary values in memory.
8. Map the symbol matrix into a linear sequence of binary values.
9. Determine the symbol format from the binary data.
10. Apply relevant error detection and correction to the linear sequence.
11. Extract the data payload to generate the barcode information.

In the above example process, the numbered steps 1-5 generally correspond to capturing and preparing an image for decoding (also described herein as image pre-processing), and numbered steps 6-11 generally correspond to "decoding" the barcode itself. At the conclusion of these process steps the barcode information can be used, sorted, associated with an equipment descriptor, stored in a database, etc.

A tag with a bend of approximately 135° can be suitable for a camera mounted in an elevated location. Such a bend angle results in approximately a 45° angle relative to the front panel of the equipment, which is likewise approximately a 45° angle relative to the horizontal. In other situations, it can be desirable to use a camera that is hand-held, body-worn or mounted on a platform such as a mobile robot. In these cases, a tag 17 having a 90° or similar bend can provide a more optimal barcode scanning from a position approximately half-rack high.

FIG. 10 illustrates an example perforated barcode tag 17 having a right-angle bend. FIG. 11 illustrates such an example tag 17 as shown in FIG. 10 attached to (i.e., mounted on) an equipment item 1. Other angle increments can be selected depending on the typical camera location and rack height.

To avoid the overhead of affixing an angled and perforated barcode 6, 7 to equipment, the active area of the perforated tag 6, 7 can be incorporated into the equipment 1 by the equipment manufacturer, with each equipment item having a unique code. The perforated tag 17 is located on an exterior surface of the equipment 1 that is visible when the equipment is installed. The perforated tag 7 will not significantly impede airflow and the tag itself can form part of the protective grill or bezel 18, which itself can be fixed or removable.

FIG. 14 illustrates an example barcode having a one-dimensional barcode symbol, attached to a front panel of a rack-mountable equipment item. Referring to the non-limiting example of FIG. 14, an example one-dimensional barcode is constructed as a slotted tag 22, using encoding such as Code 39 or Interleaved 2 of 5, where airflow slots 23 can form either the "white-space" or the active bars of the symbol. When mounted on equipment 21 the slots allow air flow while enabling a large symbol that can be scanned reliably from a distance. The base material (i.e., base layer) of the slotted tag 22 can be a dark color, while the front surface can be a light color. FIG. 15 is a shaded version of FIG. 14, to better show contrast between the surface of the barcode tag and the front panel of the equipment item. If the slotted tag is manufactured using a subtractive process such as, for example, a CNC mill or laser cutter, the base material will be exposed when the slots are cut, providing high contrast between the face of the tag and other areas. The example slotted tag 22 shown in FIG. 14 encodes the serial number 000013 in interleaved 2 of 5 format. The slotted tag 22 will not significantly impede airflow and the tag itself can form part of the protective grill or bezel 24.

FIG. 12 illustrates an example perforated barcode integrated into an equipment item. Referring now to the non-limiting example of FIG. 12, an example perforated tag 17 is shown incorporated into the front panel 18 of the equipment item 1. In some embodiments, the tag can be inserted into a slot formed in the front panel.

When monitoring many equipment items, it may be impractical or cost prohibitive to have fixed cameras monitoring all locations. Periodic monitoring for recording, verification or auditing can be achieved with a mobile reader. FIG. 16 illustrates an equipment rack and a camera positioned in front of the rack on a mobile platform. Referring to the non-limiting example of FIG. 16, an example mobile reader system can include a manually operated cart 29 or an autonomous robot. The cart 29 can contain a camera 27 that is directed by the operator at an area such as a rack 28 with tags 26 in view. A computer 25 can read one or more images from the camera and decode the barcodes. In some embodiments, a series of images can be stitched together to create a composite representation of a large area. In some embodiments, the computer 25 can be equipped with a positioning system, such as GPS, to provide a reference point for the equipment location. In some embodiments, the computer 25 can be equipped with a network interface, such as a wireless interface, to communicate to a database server external to the computer 25.

Figure 17:
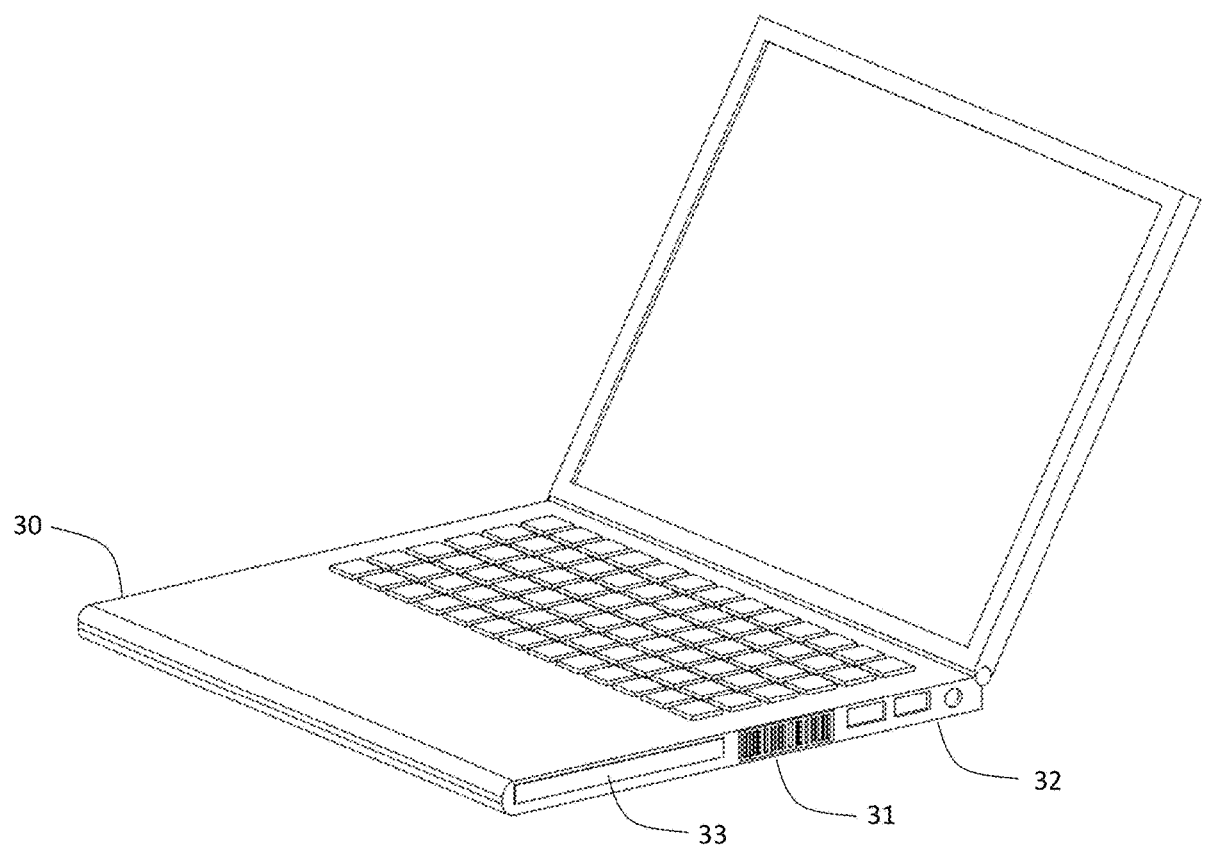
FIG. 17 illustrates an example perforated barcode tag having a linear barcode integrated into an equipment item.

FIG. 17 illustrates an example perforated barcode having a linear barcode integrated into an equipment item. Referring to the non-limiting example of FIG. 17, an example barcode tag 31 can be incorporated into other equipment such as a laptop computer 30. The barcode tag 31 has slots that serve both as elements of the barcode symbol and as ventilation for the equipment. The advantage of the slotted or perforated barcode tag in this application is that there are few, if any, locations for a barcode that is visible both when the device is in use and also when it is stacked. Alternative locations for a conventional label are very limited due to design features such as peripherals 33 and connectors 32.

Low-cost 3D printing and CNC manufacturing make it possible and practical to fabricate unique barcode tags on demand. Tags can be integrated into a device, requiring an exterior component of that device to have a pattern of holes or slots forming a uniquely identifiable barcode symbol. This component can be manufactured or customized using an additive or subtractive process immediately prior to installation in or on the equipment.

As can be appreciated, many aspects of inventive concepts are disclosed herein. In one aspect, a barcode tag includes a barcode symbol that is perforated rather than printed. Such a barcode tag can include an attachment surface, and in some examples, the attachment surface can be self-adhesive. In some examples, the barcode tag can have a surface, particularly around the barcode symbol itself, that reflects incident light, such as infrared light, to provide contrast to the light reflectivity of the equipment item to which the barcode is attached. In some examples the barcode tag can be fabricated using a material that is sufficiently flexible to allow equipment installation into and removal from an equipment rack without having to remove the tag. In some examples, the perforated holes of the barcode symbol can be non-uniform in size. In some examples, the barcode tag can include an RFID device to identify an equipment item to which it can be attached, to provide a second method of determining the presence and/or location of the equipment item.

In another aspect, a barcode tag includes a bend, and one side of the bend includes a surface that can be attached to a surface of an electronic equipment, and the barcode symbol is on the other side of the bend and can remain visible. In some examples, the barcode tag can have a surface on the side having the barcode symbol that reflects incident light, such as infrared light, to provide contrast to the light reflectivity of the equipment item to which the barcode is attached. In some examples, the barcode symbol can be printed or embossed on a base material (i.e., base layer) forming the tag. In some examples, the barcode symbol can be formed by perforations through the base material forming the tag. In some examples, the barcode tag can include a contrasting area on the side having the barcode symbol. Such a contrasting area can improve readability of another perforated barcode that may be partially in front of such a tag. In some examples the barcode tag can be fabricated using a material that is sufficiently flexible to allow equipment installation into and removal from an equipment rack without having to remove the tag. In some examples of a perforated tag, the perforated holes of the barcode symbol can be non-uniform in size. In some examples, the barcode tag can include an RFID device to identify an equipment item to which it can be attached, as a second method of determining the location of the equipment item.

In another aspect, a system is provided for determining the presence and location of equipment items within a group, such as within an equipment rack, using barcode tags, a camera, and video or images analytics capable of reading multiple barcode tags. In some examples, a barcode tag can be attached in blank spaces or panels between equipment items, and such barcode encoded to indicate that the space is blank or empty.

In some examples, additional reference barcode tags can be affixed on the extremes of the containing device or rack. For example, the reference barcodes can encode an identifier for that equipment containing device or rack. As another example, the reference barcodes can encode the total number of equipment spaces or slots in the containing device or rack.

In some examples, the camera can be affixed to an adjacent surface or object relative to the equipment rack. In some examples, the camera can be held by or worn by an operator, such as a datacenter technician. In some examples, the camera can be attached to or integrated into a mobile robot.

In another aspect, a perforated barcode tag can be incorporated into an element of the exterior of an equipment item. In some examples, the barcode tag can include a two-dimensional barcode symbol formed by generally circular holes. In some examples, the barcode tag can include a one-dimensional barcode symbol formed by linear slots. In some examples, such a one-dimensional or two-dimensional barcode tag can include a surface having a color or reflectivity that contrasts to the base material of the tag.

In another aspect, a method for automatic tracking the presence and location of an array of equipment items within an equipment rack is provided. In some examples, a method includes using a fixed camera having controllable focus, each equipment item having a barcode, and the rack having reference barcodes at the top and bottom. For example, the camera starts at a focal control limit then increments the focus (i.e., focal distance) until the first reference barcode is detected. The camera then starts at the opposite focus control limit, and increments focal distance until the second reference barcode is detected. The number of focal distance steps between the two reference barcodes is divided by the number of equipment levels (slots) in the rack to give a focal control increment. The camera then adjusts the focal distance by the focal control increment, then captures an image, and scans for any barcodes. This continues until the focal control has swept to the other limit, at which point the first reference barcode can be detected as a validation of the scans for the rack. Duplicate barcodes can be discarded. In some embodiments, the first instance of a given barcode can be retained, and additional instances of the given barcode discarded. In some embodiments, an arithmetic mean can be determined for the focal distance corresponding to each instance of a given barcode, and the arithmetic mean focal distance retained.

In another aspect, a method for determining the presence of equipment items in a containing device or rack, each equipment item having an affixed barcode, the rack having reference barcodes affixed at the extremes of each row of assets, is provided. In some examples, a method includes capturing an image of the rack, decoding all the barcodes on the rack, determining if at least one reference barcode was detected, reading the rack identifier and rack size from the reference barcode, and continuing image captures until the total number of unique asset and blanking barcode tags matches the rack size, or a time-out occurs.

In some examples, a method includes using the reference barcodes to determine whether the equipment items correspond to one sorting axis (i.e., 1-2 reference barcodes of the same ID on the equipment rack) or two sorting axes (i.e., 3-4 reference barcodes of the same ID on the equipment rack). In some examples, a method includes sorting the barcodes by position into a 1-axis (linear) or 2-axis array, and storing the position of each equipment item based on an index in the array.

As can be appreciated by a skilled artisan, disclosed embodiments of a system can reliably and at low cost, track equipment presence, location within a rack, and rack identification, achieved with minimal thermal and mechanical impact in a system that can operate in real time or periodically as needed.

Definitions for other certain words and phrases are provided throughout this patent document. Those of ordinary skill in the art should understand that in many if not most instances, such definitions apply to prior as well as future uses of such defined words and phrases.

As used herein, the terms "barcode" and "barcode symbol" refer to any machine-readable pattern, including one-dimensional barcodes, two-dimensional barcodes, circular barcodes, etc. The term "equipment rack" means any containing device having slots or positions into which an equipment item (or other type of asset) can be installed or mounted. The term "base layer" can refer to a single monolithic layer, and can refer to a multi-layer base layer.

For clarity, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Certain features that are, for clarity, described herein in the context of separate embodiments, may also be provided in combination in a single embodiment. Conversely, various features that are, for brevity, described in the context of a single embodiment, may also be provided separately or in any sub-combination. Further, references to values stated in ranges include each and every value within such ranges.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Note that not all of the activities described above in the general description or the examples are required, that a portion of a specific activity may not be required, and that one or more further activities may be performed in addition to those described. Still further, the order in which activities are listed are not necessarily the order in which they need be performed.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A barcode tag comprising:
    a base layer having a front side and a back side, and comprising a bend that defines non-coplanar respective first and second sections on opposite sides of the bend;
    an attachment surface disposed within the second section on at least a portion of the front side or the back side; and
    a barcode symbol disposed within the first section and comprising plural perforations formed entirely through the base layer.

2. The barcode tag as in claim 1 wherein:
    the front side of the base layer around the plural perforations is reflective of infra-red light.

3. The barcode tag as in claim 1 wherein:
    the attachment surface includes an adhesive coating to provide a self-adhesive attachment surface.

4. The barcode tag as in claim 1 further comprising:
an RFID device.

5. The barcode tag as in claim 1 wherein:
the plural perforations comprise linear slots, and the barcode symbol is a one-dimensional bar code formed by the linear slots.

6. The barcode tag as in claim 1 wherein:
the plural perforations comprise generally circular holes, and the barcode symbol is a two-dimensional bar code formed by the generally circular holes.

7. The barcode tag as in claim 6 wherein:
the plural perforations are non-uniform in size, with individual perforations that are not adjacent to another perforation having a larger size than individual perforations that are adjacent to another perforation.

8. The barcode tag as in claim 1 wherein:
the bend forms an obtuse angle so that, when the barcode tag is attached to an equipment item, the second section contacts a first surface of the equipment item, and the first section forms an acute angle with respect to a second surface of the equipment item perpendicular to the first surface of the equipment item.

9. The barcode tag as in claim 8 wherein:
the barcode symbol is disposed within a first portion of the first section; and
a second portion of the first section different than the first portion includes a surface that is different in reflectivity of incident light than is a surface of the first portion.

10. The barcode tag as in claim 9 wherein:
the surface of the first portion is at least 50% more reflective of incident light than the surface of the second portion.

11. The barcode tag as in claim 8 wherein:
the attachment surface includes an adhesive coating to provide a self-adhesive attachment surface.

12. The barcode tag as in claim 1 wherein:
the bend forms approximately a right angle so that, when the barcode tag is attached to the equipment item, the second section contacts a first surface of the equipment item, and the first section is adapted to contact a second surface of the equipment item perpendicular to the first surface of the equipment item.

13. A barcode tag comprising:
a base layer having a bend that defines non-coplanar respective first and second sections on opposite sides of the bend;
a barcode symbol disposed within the first section; and
an attachment surface disposed within the second section, said attachment surface adapted to attach the barcode tag to an equipment item.

14. The barcode tag as in claim 13 wherein:
the barcode symbol comprises a patterned surface layer disposed on a front surface of the base layer.

15. The barcode tag as in claim 14 wherein:
the barcode symbol comprises a printed or embossed pattern on the front surface of the base layer.

16. The barcode tag as in claim 13 wherein:
the barcode symbol comprises plural perforations formed entirely through the base layer.

17. The barcode tag as in claim 16 wherein:
the plural perforations comprise linear slots, and the barcode symbol is a one-dimensional bar code formed by the linear slots.

18. The barcode tag as in claim 16 wherein:
the plural perforations comprise generally circular holes, and the barcode symbol is a two-dimensional bar code formed by the generally circular holes.

19. The barcode tag as in claim 18 wherein:
the generally circular holes comprise polygonal openings.

20. The barcode tag as in claim 13 wherein:
the bend forms an obtuse angle so that, when the barcode tag is attached to the equipment item, the second section contacts a first surface of the equipment item, and the first section forms an acute angle with respect to a second surface of the equipment item perpendicular to the first surface of the equipment item.

21. The barcode tag as in claim 13 wherein:
the bend forms approximately a right angle so that, when the barcode tag is attached to the equipment item, the second section contacts a first surface of the equipment item, and the first section is adapted to contact a second surface of the equipment item perpendicular to the first surface of the equipment item.

22. The barcode tag as in claim 18 wherein:
the plural perforations are non-uniform in size, with individual perforations that are not adjacent to another perforation having a larger size than individual perforations that are adjacent to another perforation.

23. The barcode tag as in claim 13 further comprising:
an RFID device.

* * * * *